US009574926B2

(12) United States Patent
Berberig et al.

(10) Patent No.: US 9,574,926 B2
(45) Date of Patent: Feb. 21, 2017

(54) MEASURING TUBE FOR A FLOW MEASURING DEVICE AND FLOW MEASURING DEVICE

(71) Applicant: Endress + Hauser Flowtec AG, Reinach (CH)

(72) Inventors: Oliver Berberig, Grenzach-Wyhlen (DE); Andreas Berger, Glashutten (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 14/917,662

(22) PCT Filed: Aug. 11, 2014

(86) PCT No.: PCT/EP2014/067179
§ 371 (c)(1),
(2) Date: Mar. 9, 2016

(87) PCT Pub. No.: WO2015/036189
PCT Pub. Date: Mar. 19, 2015

(65) Prior Publication Data
US 2016/0216145 A1    Jul. 28, 2016

(30) Foreign Application Priority Data

Sep. 12, 2013    (DE) .......................... 10 2013 015 038

(51) Int. Cl.
*G01F 1/58*      (2006.01)
*G01F 15/18*     (2006.01)
(Continued)

(52) U.S. Cl.
CPC ............... *G01F 15/18* (2013.01); *B23K 20/12* (2013.01); *B23K 20/129* (2013.01);
(Continued)

(58) Field of Classification Search
CPC ................ G01F 1/58; G01F 1/66; G01F 1/20
(Continued)

(56) References Cited

U.S. PATENT DOCUMENTS 7,044,001 B2 *   5/2006   Sylvia ................... G01F 1/662
                                                  73/861.29
7,614,309 B2 *  11/2009   Rieder .................. G01F 1/662
                                                  73/861.27
(Continued)

FOREIGN PATENT DOCUMENTS

DE    102007016991 A1    10/2008
DE    102009046886 A1     9/2011
(Continued)

OTHER PUBLICATIONS

English Translation of the International Preliminary Report on Patentability, WIPO, Geneva, CH, Mar. 24, 2016.
(Continued)

*Primary Examiner* — Jewel V Thompson
(74) *Attorney, Agent, or Firm* — Bacon & Thomas, PLLC

(57) ABSTRACT

A measuring tube for a flow measuring device, wherein the measuring tube has a measuring tube axis A and a measuring tube wall. The measuring tube has a branch with a branch axis B and a wall of the branch, wherein the wall of the branch is arranged on the measuring tube wall, and the wall of the branch is connected with the measuring tube wall by a welded joint. In the transitional region between the wall of the branch and the measuring tube wall there is a specially embodied thickening of the material, which is either part of the wall of the branch or part of the measuring tube wall.

10 Claims, 6 Drawing Sheets

(51) Int. Cl.
*B23K 20/12* (2006.01)
*B23K 33/00* (2006.01)
*G01F 1/66* (2006.01)
*G01P 5/24* (2006.01)
*F16L 41/08* (2006.01)
*F16L 41/00* (2006.01)

(52) U.S. Cl.
CPC .......... *B23K 26/282* (2015.10); *B23K 33/006* (2013.01); *G01F 1/667* (2013.01); *G01F 15/185* (2013.01); *G01P 5/245* (2013.01); *B23K 2201/20* (2013.01); *B23K 2201/36* (2013.01); *F16L 41/008* (2013.01); *F16L 41/082* (2013.01)

(58) Field of Classification Search
USPC .............. 73/861.18, 861.27, 861.29, 861.31, 73/861.12
See application file for complete search history.

(56) References Cited

U.S. PATENT DOCUMENTS 7,752,919 B2 * 7/2010 Straub, Jr. ............... G01F 1/667 73/861.27
8,904,861 B2 12/2014 Berger
2004/0011141 A1 * 1/2004 Lynnworth ............. G01F 1/667 73/861.27
2006/0278015 A1 * 12/2006 Wiest ...................... G01F 1/662 73/861.18

FOREIGN PATENT DOCUMENTS

| DE | 102011087595 A1 | 6/2013 |
| EP | 0408148 A1 | 1/1991 |
| WO | 2007059790 A1 | 3/2007 |
| WO | 2015036189 A1 | 3/2015 |

OTHER PUBLICATIONS

International Search Report, EPO, The Netherlands, Nov. 27, 2014.
German Search Report, German Patent Office, Munich, DE, Sep. 19, 2013.

* cited by examiner

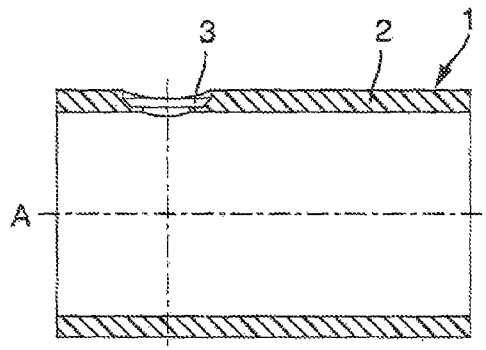
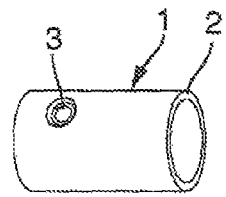
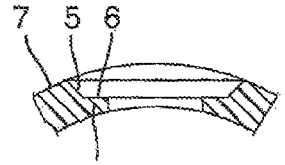
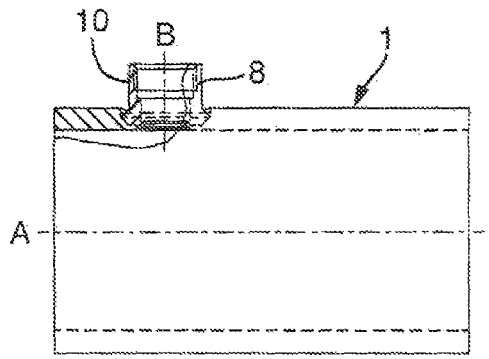
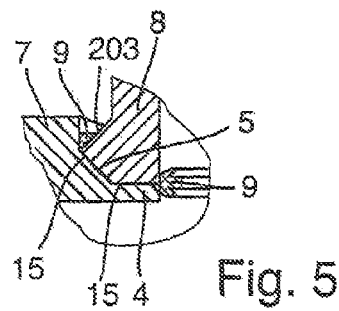
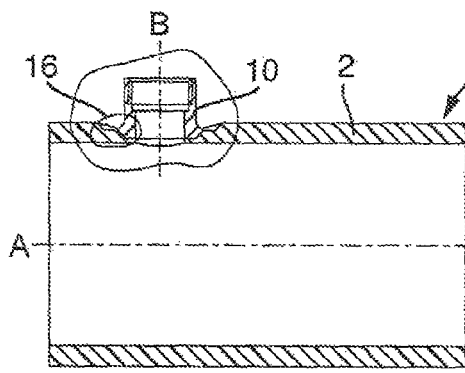
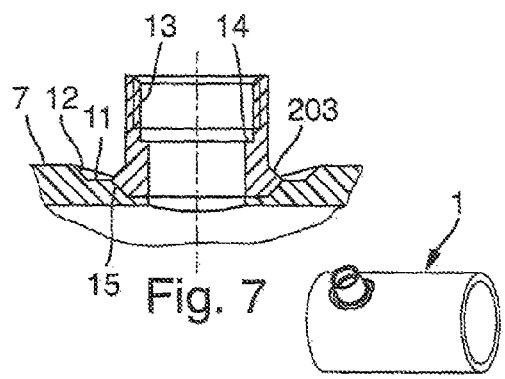
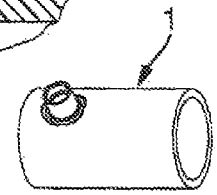

MEASURING TUBE FOR A FLOW MEASURING DEVICE AND FLOW MEASURING DEVICE

TECHNICAL FIELD

The present invention relates to a measuring tube for a flow measuring device as defined in the preamble of claim 1 and to a flow measuring device.

BACKGROUND DISCUSSION

Flow measuring devices are frequently composed of at least one tube segment, in which openings must be machined, in order that sensors or transducers can have direct access to the measured medium. Examples for this include especially ultrasonic, inline, flow meters, and also thermal flow meters, vortex flow meters and magneto inductive flow meters. In order that these sensors or transducers are not supplementally exposed to the kinetic energy of the flow, they are mounted with a certain set back. For this, a branch is required, for example, a branch embodied as a nozzle. The nozzle must be able to withstand the process pressure, provide a mechanical connection of the sensor or transducer and be joined durably with the measuring tube.

A typical example of use of such nozzles is for ultrasonic, inline, flow measuring devices. Flow measuring devices are often applied in process and automation technology. They permit efficient determination of volume flow and/or mass flow in a pipeline.

Known ultrasonic, inline, flow measuring devices frequently work according to the travel-time difference principle. This is illustrated in FIG. 17. In such case, the different travel times of ultrasonic waves, especially ultrasonic pulses, or so-called bursts, are evaluated with and against the flow direction of the liquid. For this, ultrasonic pulses are sent at a certain angle to the tube axis both with as well as also counter to the flow. From the travel-time difference, the flow velocity and therewith in the case of known diameter of the pipeline section the volume flow can be determined.

The ultrasonic waves are produced, respectively received, with the assistance of so-called ultrasonic transducers. For this, such as shown in FIG. 17, in the case of so-called inline, ultrasonic, flow measuring devices 101, sensors 102 in the form of ultrasonic transducers are secured in the tube wall of the relevant measuring tube 103. The evaluation of the ascertained signals occurs in an evaluation unit 104.

The ultrasonic transducers are composed, normally, of an electromechanical transducer element, e.g. a piezoelectric element, and a coupling layer. The ultrasonic waves are produced in the electromechanical transducer element as acoustic signals and conveyed via the coupling layer to the tube wall and from there in the case of the inline variant led into the liquid.

The ultrasonic transducers are usually secured to the measuring tube by means of sensor nozzles distributed over the periphery of the measuring tube and inclined relative to the tube axis. The sensor nozzles must be welded in place manually. Thus, as a rule, manual welding methods are used as joining technology in this situation, because the nozzles are small in number, often tilted, partially poorly accessible, and must be placed on a round tube. Problematic, in such case, is that, as a result of the manual manufacture of the connection by means of conventional welding methods (typically metal protective gas welding, tungsten inert gas welding), the bonding of the branch is burdened with geometry varying over the periphery, residual stresses in the material and local hard spots in the material. Especially, the geometric variations of the welded seams can lead to the fact that local stress concentrations occur upon loading of the branch by an external bending moment. In the extreme case, such concentrations can lead to a component failure, especially in the case of a frequently oscillating loading.

SUMMARY OF THE INVENTION

An object of the invention is to minimize stresses in the material as a result of loading of a measuring tube, which has one or more branch connections. This minimizing can preferably occur defined and reproducibly over the total circumference of the connection.

A measuring tube of the invention for a flow measuring device includes a measuring tube axis A and a measuring tube wall, as well as a branch with a branch axis B and a wall of the branch. The wall of the branch is arranged on the measuring tube wall. Both the wall of the branch as well as also the measuring tube wall belong, thus, according to definition, to the measuring tube.

The wall of the branch is connected with the measuring tube wall by a welded joint. This means that the adjoining surfaces of the wall of the branch and the measuring tube wall are connected with one another essentially flushly over the region of the joint.

The course of an outer contour of the measuring tube contains in at least one cutting plane defined by the branch axis and the measuring tube axis a transitional region, in which the outer contour transitions from a course parallel to the measuring tube axis A to a course parallel to the branch axis B.

The measuring tube wall and/or the wall of the branch have in this transitional region a thickening of the material surrounding the branch axis B. The thickening may have in cross section a straight slope or be curved and forms a subsection of the outer contour of the measuring tube. The mentioned thickening of the material can be concave, have a straight slope, or be convex. Preferably, it has a 45° straight slope.

The thickening of the material includes a starting point, at which the wall thickness of the measuring tube wall or the wall of the branch increases relative to a preceding section and an end point, where the contour transitions into an adjoining section. The preceding section, in such case, especially preferably, likewise borders the straight slope or the rounding.

The starting point and the end point lie respectively on straight lines. In such case, a first of these lines extends parallel to the measuring tube axis and a second of these lines extends parallel to the branch axis B. These lines serve firstly for defining a shared point of intersection. This intersection of the first and second lines defines beginning and end points of a triangle. Finally, there is a distance between this intersection and the nearest point on the surface of the thickening of the material, thus to the straight slope or rounding, which in the following is referred to as the operative thickening distance (TD) of the material. This intersection lies on the measuring tube.

This determinative thickening distance (TD) of the material is so embodied that it is either greater than or equal to 0.7 times the wall thickness of the wall of the branch, when the wall thickness of the wall of the branch is less than the wall thickness of the measuring tube wall, or greater than or equal to 0.7 times the wall thickness of the measuring tube wall, when the wall thickness of the measuring tube wall is less than the wall thickness of the wall of the branch. If there results from the aforementioned specification for the TD a distance greater than or equal to 6 mm, then, deviating from the specification, the distance TD can be limited to a constant value of 6 mm.

An essential advantage over the above mentioned conventional method for mounting branches is that according to the invention the thickening of the material at the transition between measuring tube and branch is processable by machining, thus, for example, by turning or milling. In this way, it is assured that a design developed, stress minimizing geometry is directly transferable to the component, while maintaining defined tolerances and in the context of reproducibility corresponding to the capabilities of the applied machine tool.

The welded connection between the measuring tube and branch, in turn, is especially preferably produced by a machine welding method, preferably a friction welding method, so that also in this case close tolerances are maintained and a high reproducibility is assured.

By use of a stress optimizing thickening of the material especially in combination with a machine manufacture of the same and the machine welded connection, an especially low stress branch is provided, which can be embodied, for example, as a sensor nozzle, transducer nozzle or bypass. The branch includes, in such case, an especially high resistance to bending moments applied to the branch and to stress concentrations in the transition to the measuring tube. Due to the optimized thickening geometry of the material, stress concentrations are smaller than in the case of conventional branch connections. Here there are especially no accidentally arising stress peaks as a result of manual weld bead defects and here a uniform stress distribution over the entire transition can be achieved, for example, by means of finite element optimizing methods. Thus, in the case of comparable dimensions of the thickening of the material, a strengthwise higher quality connection between measuring tube and branch can be realized. Additionally, costs can be saved, because the manufacturing times for the connection can be greatly lessened by using preferably applied machine welding methods, such as e.g. rotational friction welding.

These stress optimized branches can be used, for example, in ultrasonic, inline, flow measuring devices, in magneto inductive flow measuring devices, in thermal flow measuring devices, in pressure measuring devices, in vortex flow measuring devices, in pressure difference measuring devices and the like.

Advantageous embodiments of the invention are subject matter of the dependent claims.

It is advantageous to have the welded joint be a friction welded joint. By the special geometry of the measuring tube, the wall of the branch is securable to the measuring tube wall by means of a friction welding method. Friction welding is a joining technology for forming a welded joint within a few seconds. This applies especially to a friction welded connecting seam. Compared to conventional manual welding methods, friction welding provides a greatly increased productivity, so that the measuring tube manufacture can be significantly more efficient. Moreover, the especially localized melting of the material minimizes the heat input, whereby after cooling of the welded connection especially little residual stress is present. This supports keeping stresses in the material in the transition between measuring tube and branch especially small.

Preferably, the friction welded joint is created by, first of all, producing a friction welded connection with the forming of a material protrusion, respectively a weld seam bead and this material protrusion is then removed. In the case of friction welding of a branch, preferably a predrilled component is inserted into the joint cross section, so that weld seam beads form internally and externally. By drilling or milling the branch to the desired branch diameter together with drilling/milling through the measuring tube, a defined access to the measuring tube is formed, which simultaneously provides that the internal material protrusion is removed residue freely. In this way, the joint has no material protrusion relative to adjoining surfaces of the material. This terminal working step especially relative to the removal of the bead of the material directed toward the branch axis is necessary, since the material is scaled and tends to corrode in the case of fluid contact.

The branch can be applied advantageously as a sensor nozzle for connecting a medium-contacting sensor to the measuring tube. In the case of an ultrasonic, flow measuring device, the sensor can especially be an ultrasonic transducer, which has a medium-contacting surface and thereby enables introduction of the signal into the fluid, respectively process medium. Applications can include also sensors, which are not directly intended for flow measurement. An application can especially also be an MSM-electrode (measured substance monitoring), which determines the fill level of a measuring tube.

The branch can additionally be a nozzle for connecting an evaluation unit to the measuring tube. In the case of some measuring devices, for example, in the case of thermal flow measuring devices, in the case of which the electronic evaluation unit forms a structural unit with the sensor, the nozzle can hold both the sensor as well as also the electronic evaluation unit.

The joint can advantageous directly adjoin the sloped surface or rounding.

The wall of the branch can advantageously have the sloped surface or rounding and the end point of the sloped surface or rounding can at the same time be the greatest thickening of the material of the wall of the branch in the radial direction from the branch axis. In this way, the measuring tube wall needs for bonding of the branch only minimal reduction in its wall thickness, whereby the measuring tube wall remains able to contain pressure.

For better accessibility of the seam location, respectively the joint, it is advantageous to have the adjoining section or the preceding section of the sloped surface be a planar area, which extends parallel to the measuring tube axis. The planar area can advantageously be associated with the measuring tube wall. Especially, the outer bead of material occurring in the case of the manufacture of the frictional weld connection can then be better removed.

The measuring tube wall can alternatively to the wall of the branch have the sloped surface or rounding. However, the variant with the sloped surface or rounding on the wall of the branch is the preferred embodiment, since the measuring tube, in such case, then remains better pressure resistant.

A flow measuring device of the invention, especially an ultrasonic, inline, flow measuring device, includes a measuring tube as claimed in claim 1, at least one medium-contacting sensor and an evaluation unit, wherein at least the sensor is secured to the measuring tube by means of the branch.

BRIEF DESCRIPTION OF THE DRAWINGS

Preferred examples of embodiments of the invention will now be explained in greater detail based on the appended drawing, the figures of which show as follows:

FIG. 1 is a sectional view of a tube segment of a first measuring tube with a formed section for accommodating a nozzle;

FIG. 2 is a detail view of the tube segment of FIG. 1;

FIG. 3 perspective view of the tube segment of FIG. 1;

FIG. 4 is a sectional view of the tube segment of the measuring tube with a welded-on nozzle;

FIG. 5 is a detail view of the tube segment of FIG. 4;

FIG. 6 is a sectional view of the tube segment of the measuring tube with the nozzle after finish working;

FIG. 7 is a detail view of the tube segment of FIG. 6;

FIG. 8 is a perspective view of the tube segment of FIG. 6;

DETAILED DISCUSSION IN CONJUNCTION WITH THE DRAWINGS

The examples of embodiments illustrated in FIGS. 1-23 concern, firstly, an ultrasonic, inline, flow measuring device. However, also other sensors can be connected to a measuring tube by means of the nozzles illustrated in FIGS. 1-23. Thus, for example, another kind of device would be a thermal flow measuring device, for example, a T-Mass 65F thermal flow measuring device of Endress+Hauser.

Figure 17:
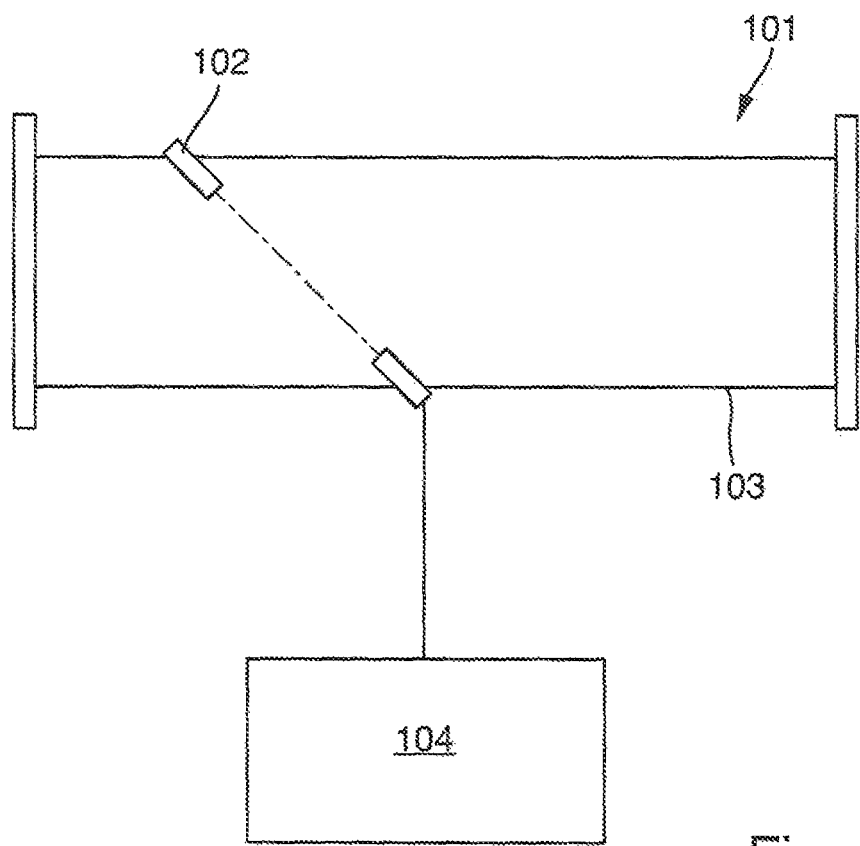
FIG. 17 is a schematic view of an ultrasonic, flow measuring device with a measuring tube.

FIG. 17 shows the fundamental setup of an ultrasonic, inline, flow measuring device, such as already mentioned above. For mounting the ultrasonic transducers, sensor nozzles are required, which represent one application of the branches of a measuring tube discussed herein.

FIGS. 1-3 show a tube segment 1 of a measuring tube of the invention having a measuring tube axis A. Tube segment 1 includes a measuring tube wall 2 and a seat 3 introduced into the measuring tube wall 2. Seat 3 serves for connecting a branch, which is embodied in the present example of an embodiment as a sensor nozzle.

Seat 3 includes, in such case, provided in the measuring tube wall 2, a collar 4, which has a planar area 6, which is arranged parallel to the measuring tube axis A. Arranged between this planar area 6 of the collar 4 and an outer surface 7 of the measuring tube wall 2 is an inclined transition surface 5, whose inclination relative to the surface 6 of the collar 4 assumes an angle in the sectional view of FIG. 1 of preferably 120-150°, especially preferably 135°.

FIGS. 4 and 5 show a branch 10 welded to the measuring tube wall 2. Branch 10 has a wall 8 and a branch axis B. FIG. 5 shows material protrusions 9, which are formed of the material of the measuring tube wall and the material of the wall of the branch due to the welding method, which in the present example of an embodiment is a friction welding method. Friction welding is basically known to those skilled in the art. In such case and in the present case, a welding of the two connecting partners is achieved based on a combination of rotational velocity, compressive pressure and friction.

The joint 15 between the wall of the branch 8 and the measuring tube wall 2 should be welded, in order to be pressure tight. The means a traversing connection in the region, in which the two walls contact one another.

As evident from FIG. 5, the measuring tube includes on its outer contour in the transitional region between the measuring tube material and branch material a straight sloped surface 203, which in three dimensions is a conical surface. Alternatively, instead of the sloped surface also a rounding can be provided. The branch lies in the installed state on the planar area 6 of the collar 4.

Following the bonding by means of friction welding, the undesired material protrusions are 9 is removed. This can occur, for example, by a milling procedure, especially by contour milling. In such case, there forms on the measuring tube wall 2 in the case of a 45° contour milling procedure a planar area 11, which extends parallel to planar area 6 of the collar 4.

This is shown in FIGS. 6-8. Here we have a finished segment of a measuring tube of the invention. A milling procedure has additionally provided an inclined transitional region 12 between the surface of the measuring tube 7 and the mentioned planar area 11.

Branch 10 includes additionally an internal thread 13 and a stop 14, which serve for positioning and for securement of a sensor or evaluation unit.

Figure 18:
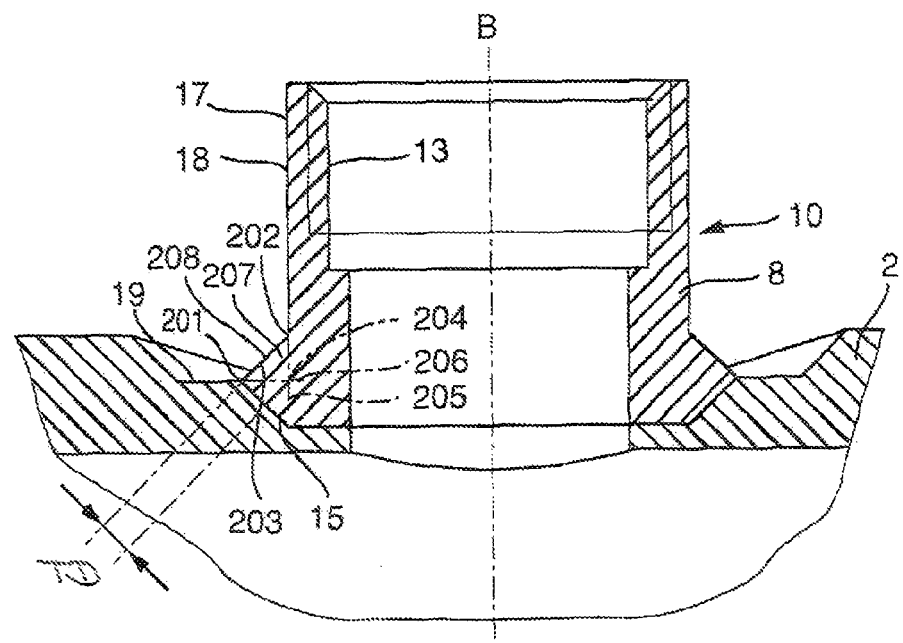
FIG. 18 is a detail view of the tube segment of FIG. 6.

FIG. 18 shows the sloped surface 203 in greater detail. Associated therewith is a thickening 207 of the material. Thickening 207 is provided in this example of an embodiment on the branch 10.

The measuring tube, as a whole, includes an outer surface, thus an outer contour. Branch axis B and measuring tube axis A define a cutting plane, which in FIG. 6 corresponds to the plane of the paper. The outer contour includes a transitional region 16, in which the outer contour transfers from a course parallel to the measuring tube axis A to a course parallel to the branch axis B.

Measuring tube wall 2 and/or wall 8 of the branch exhibit in this transitional region 16, surrounding the branch axis B, a thickening 207 of the material. Thickening 207 has a sloped surface 203, which forms a subsection of the outer contour of the measuring tube. This sloped surface has relative to the surface 17 of the wall of the branch in the sectional view of FIG. 18 an angle of inclination of preferably 120-150°, especially preferably 135°.

Thickening 207 of the material includes a starting point 202, from which the wall thickness of the wall of the branch 8 increases relative to a preceding section 18. Preceding section 18 is in the present example of an embodiment part of the branch 10 and has a cylindrical shape.

Thickening 207 includes additionally an end point 201, where the sloped surface 203 transfers into an adjoining section 19. This transition can occur at a joint 15 and the adjoining section can belong to the measuring tube wall 2. It is, however, also an option that the adjoining section still belongs to the wall of the branch.

Extending from the starting point 202 and from the end point 201 are respective lines 205 and 206. Line 206 extends parallel to the measuring tube axis A and line 205 extends parallel to the branch axis B. The first and second lines 205 and 206 have an intersection 204, which defines the beginning and end points of a triangle.

The path from this intersection to the nearest point of the sloped surface is referred to in the following as the operative thickening distance (TD) of the material.

The thickening distance TD of the material is the distance between the intersection 204 and the point 208 on the sloped surface 203 nearest to the intersection 204. TD should be greater than or equal to 0.7 times the wall thickness of the wall of the branch, since the wall thickness of the wall of the branch in present example of an embodiment is less than the wall thickness of the measuring tube wall. If there results from the aforementioned specification for the TD a distance greater than or equal to 6 mm, then, deviating from the specification, the distance TD can kept at a constant value of 6 mm.

Figure 9:
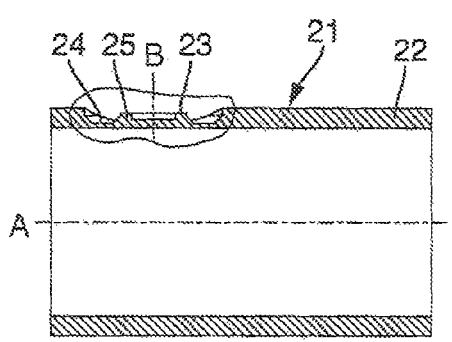
FIG. 9 is a sectional view of a tube segment of a second measuring tube with a formed section for application of a nozzle.
Figure 10:
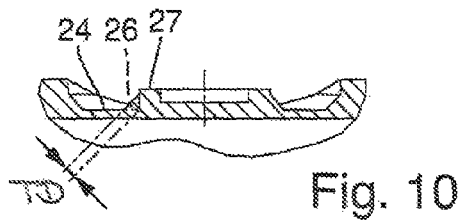
FIG. 10 is a detail view of the tube segment of FIG. 9.
Figure 11:
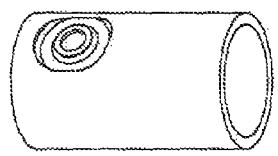
FIG. 11 is a perspective view of the tube segment of FIG. 9.

FIGS. 9-11 show a second tube segment 21 of a measuring tube of the invention having a measuring tube axis A. Segment 21 includes a measuring tube wall 22 and a milled area 23 introduced into the measuring tube wall 22. The integrity of the tube segment 21 is initially retained. The milled area 23 includes a depression 24 having a planar base and a collar projecting therefrom and having a thickening of the material 26 and a planar, annular area 27, which serves for seating a cylindrical connecting element, which later becomes part of a branch of the measuring tube. The end face of the planar, annular area 27 defines, in such case, a plane to the measuring tube axis. In the section of FIG. 9, the plane extends parallel to the measuring tube axis A.

Figure 12:
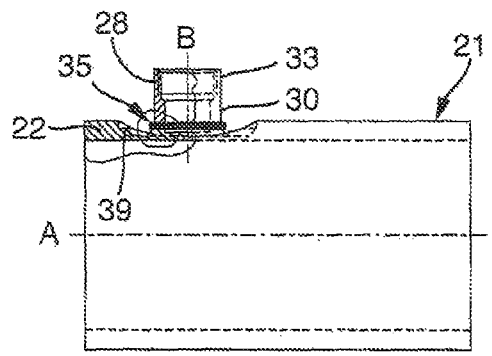
FIG. 12 is a sectional view of the tube segment of the measuring tube with a welded-on nozzle.
Figure 13:
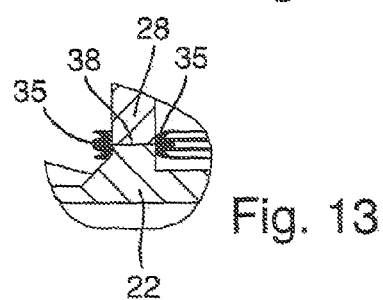
FIG. 13 is a detail view of the tube segment of FIG. 12.

FIGS. 12 and 13 show the measuring tube wall 22 and a thereto mounted wall 28 of a branch 30. Measuring tube wall 22 and branch wall 28 are connected with one another by means of a welded joint 35. In order to achieve this, a friction welding method can be applied. Alternatively, a laser welding method can be used. FIGS. 12 and 13 show additionally protrusions 35 of the material. These arise from the friction welding method and can be subsequently ground off or milled off. The branch is embodied as a cylindrical nozzle and has a branch axis B.

Figure 14:
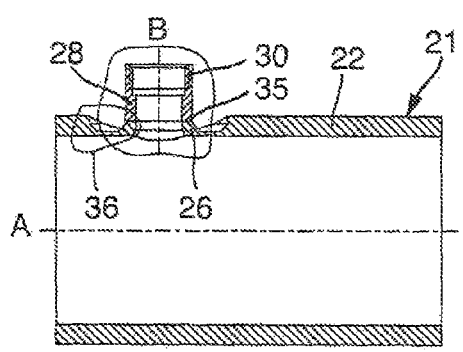
FIG. 14 is a sectional view of the tube segment with the nozzle after finish working.
Figure 15:
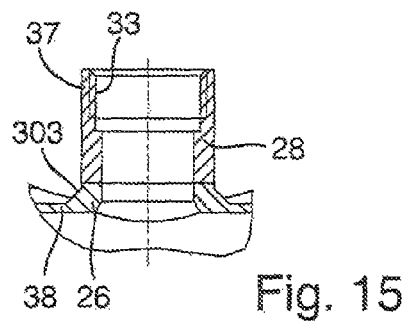
FIG. 15 is a detail view of the tube segment of FIG. 14.
Figure 16:
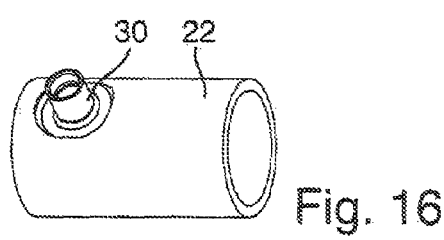
FIG. 16 is a perspective view of the tube segment of FIG. 14.
Figure 19:
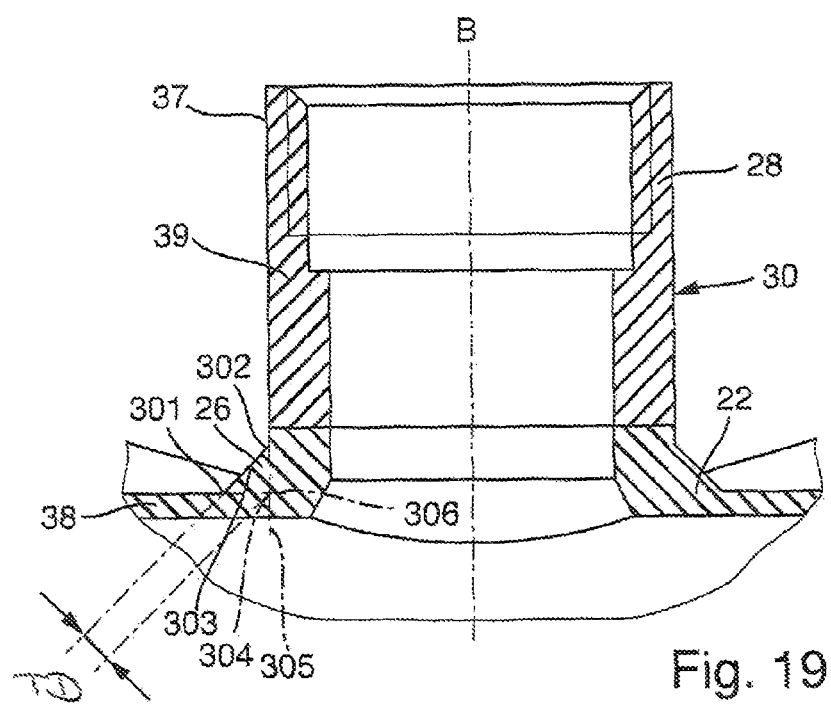
FIG. 19 is a detail view of the tube segment of FIG. 14.

FIG. 14 shows sectionally the finished product, a measuring tube in the form of the tube section 21. The outer contour of the measuring tube corresponds, apart from different wall thicknesses of the measuring tube walls, to that of FIGS. 6-8. The difference is that in this example of an embodiment the reinforcement of the material and, thus, also a sloped surface 303, is associated with the measuring tube wall 22 and not with the wall of the branch 28. The transitional region between measuring tube wall and branch is shown in FIG. 19.

The measuring tube, as a whole, has an outer surface, thus an outer contour. The branch axis B and the measuring tube axis A define a cutting plane, which corresponds in FIG. 14 to the plane of the paper. The outer contour includes a transitional region 36, in which the outer contour transfers from a course parallel to the measuring tube axis A to a course parallel to the branch axis B.

Measuring tube wall 22 and/or the wall of the branch 28 has in this transitional region 36 a material thickening 26 surrounding the branch axis B. The material thickening 26 has a sloped surface 303, which forms a subsection of the outer contour of the measuring tube. The sloped surface has relative to the surface 37 of the wall of the branch 28 an angle of inclination in the sectional view of FIG. 19 of preferably 120-150°, especially preferably 135°.

The material thickening 26 includes a starting point 301, where the wall thickness of the measuring tube wall 22 increases relative to a preceding section 38—i.e. here a section of the measuring tube wall.

The material thickening 26 has additionally an end point 302, where the sloped surface 303 transitions into an adjoining section 39. This adjoining section 39 is in the present example of an embodiment part of the wall of the branch 28.

Extending from starting point 302 and from end point 301 are respective lines 305 and 306. Line 306 extends parallel to the measuring tube axis A and line 305 extends parallel to the branch axis B. The first and second lines 305 and 306 have an intersection 304, which defines the beginning and end points of a triangle.

Finally, there is a distance between this intersection and the nearest point of the sloped surface, which distance is referred to in the following as the operative thickening distance (TD) of the material.

The thickening distance TD of the material should be greater than or equal to 0.7 times the wall thickness of the measuring tube wall, since the wall thickness of the measuring tube wall in the present example of an embodiment at least in certain regions is less than the wall thickness of the wall of the branch. If there results from the aforementioned specification for the TD a distance greater than or equal to 6 mm, then, deviating from the specification, the distance TD can be kept at a constant value of 6 mm.

In the two aforementioned examples of embodiments, the branch axis B has relative to the measuring tube axis A an angle of 90°. However, also other angle arrangements of e.g. 60° or 45° are implementable in the context of invention.

Previously, manufacture of a connection between a nozzle and a measuring tube has been associated with relatively large labor costs: First, either the nozzle or the tube must be beveled along the connecting edge. Then, after orienting and tacking of the nozzle, the weld is filled with filler metal. In the filling, depending on nozzle-, respectively tube wall, thickness, a number of weld passes must be made, during which a maximum interpass temperature must be maintained. The total welding work must take place under protective gas, in order to prevent scaling of the material. During the total welding work, a large amount of heat is introduced into the adjoining materials, which can lead to collapse of the tube material at the branch location, and, after cooling, to increased local residual stresses. Making this more difficult is that, due to the small number of nozzles, which often must be applied tilted and along a tube curvature, all the aforementioned work must typically be done manually, which means a great amount of time consumed and relatively large fluctuations in the quality of execution.

In the case of the connecting geometry of the invention, for example, a friction welding method can be applied, wherein the connection corresponds, among other things, also to the specifications for a welded connection according to the ASME.

Fundamentally, a significant advantage of the present invention is that the illustrated joints do not have to be executed as fillet welds. Instead of fillet welds, special thickenings of material in the form of a contour manufactured by machining in the solid material are provided. The contour is machined earlier into the wall of the branch or into the measuring tube wall. This procedure rests on the knowledge that the additional fillet weld in the case of branches is required, because without it in the case of bending loading of the branch a strong notch stress would occur in the transition between wall of the branch and measuring tube wall. For reducing this notch stress, so far, a fillet weld with the dimensions TD had to be executed.

If instead of the fillet weld a worked geometry of solid material is used, then the just discussed requirement can be even better fulfilled than in the case of a fillet weld, because the least distance TD is guaranteed, and because supplementally in the transitional region a continuous transition radius can be manufactured, which reduces the stress concentrations yet more.

In the case of the variant of FIGS. 9-16, the geometry is arranged on the measuring tube wall. In such case, the special geometry of the thickening of the material is locally isolated from the friction weld surface, respectively the joint. The friction weld surface is planar in such case. In the case of removing the external friction weld bead, in this instance, a cylindrical working in a plane is necessary. This type of removal is simpler than in the variant of FIGS. 1-8; it leads, however, to an increased local reduction of the original wall thickness of the measuring tube material.

Figure 20:
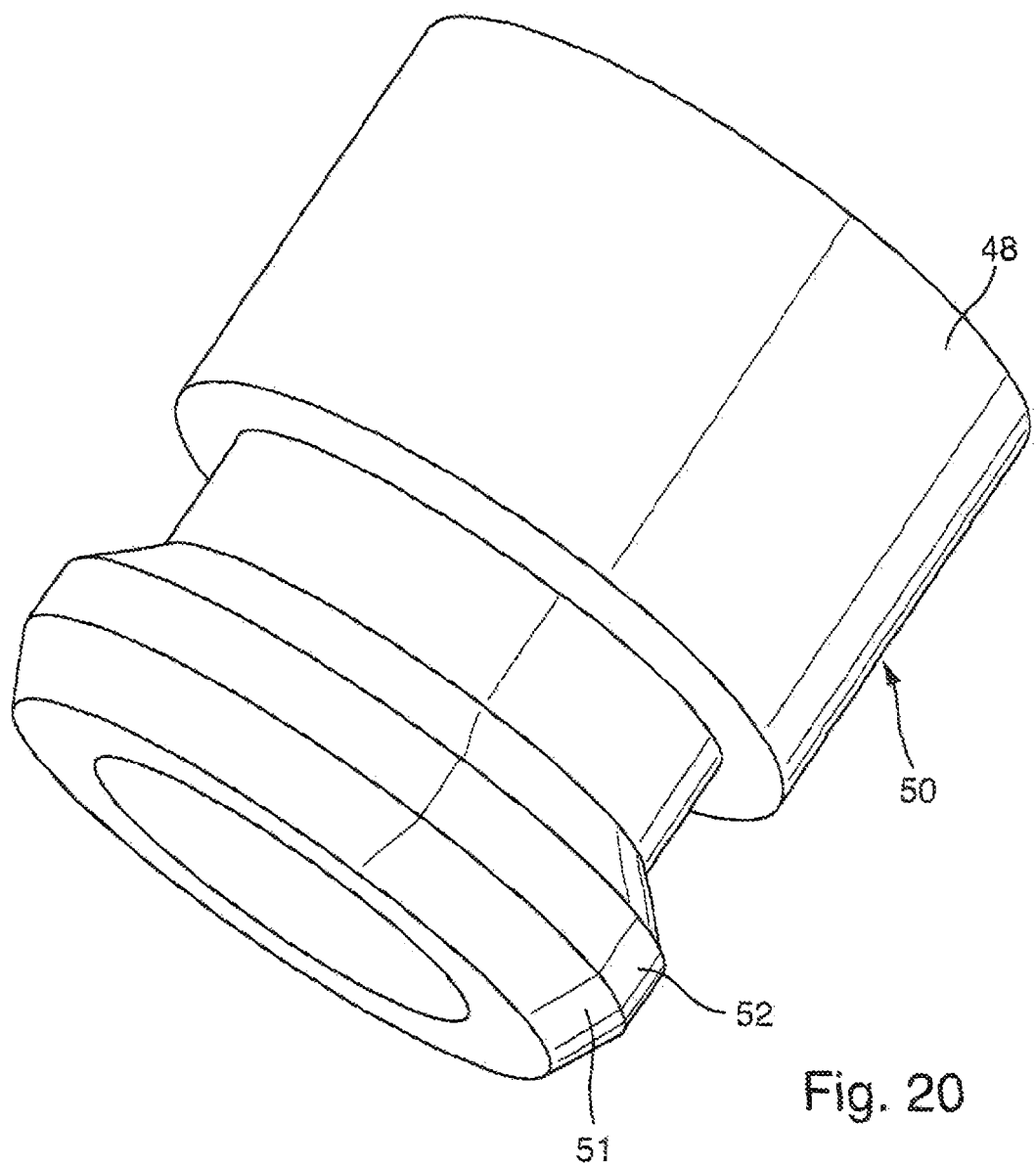
FIG. 20 is a detail view of a section of a branch of a third measuring tube.

FIG. 20 shows a branch 50 having a wall 48. Branch 50 can be connected to a measuring tube wall analogously to the provisions of FIGS. 1-8. The wall 48 includes a contact surface 51, which contacts the measuring tube wall in the friction welding. Since, in such case, a squeezing of the material takes place, a part of the material is pressed laterally out from the joint. Therefore, a cylindrical area 52, which is arranged beside the contact surface 51, becomes smaller or completely disappears in the friction welding.

Figure 21:
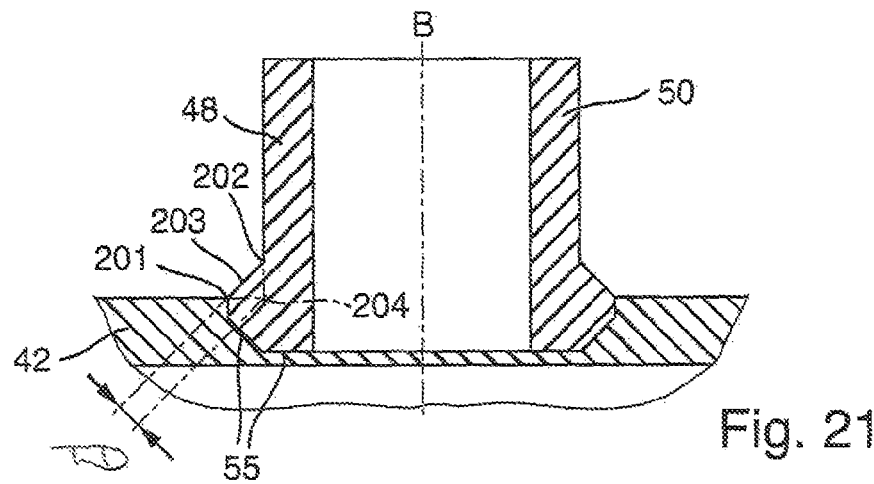
FIG. 21 is a detail view of a transitional region between a measuring tube wall and a wall of the branch of a third measuring tube.

FIG. 21 shows the bonding of the wall 48 of the branch to the measuring tube wall 42 by means of a joint 55. This joint is a welded joint, especially a friction welded joint. The bonding shown in FIG. 21 is analogous to that of FIGS. 1-8 and 18, however, without the forming of the planar area 11 by a milled removal of the measuring tube material in subsequent working. This embodiment is especially preferred, since an especially high pressure resistance of the measuring tube wall is assured in the case of this variant. The thickening of the material and the sloped surface are analogous to FIGS. 1-8 and FIG. 18. The intersection 204 is analogous to FIG. 18. The thickening distance (TD) of the material is, in such case, likewise analogous to FIG. 18.

Figure 22:
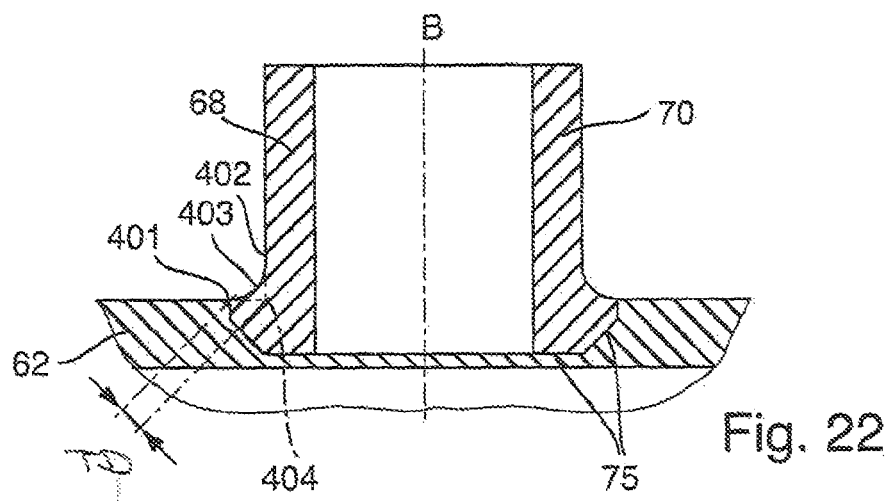
FIG. 22 is a detail view of a transitional region between a measuring tube wall and a wall of the branch of a fourth measuring tube with rounding.

FIG. 22 shows another variant of the bonding of a branch 70 having a wall 68 to the measuring tube wall 62 by means of a joint 75. This joint is likewise welded, especially friction welded. The bonding shown in FIG. 22 has in contrast with FIG. 21 a rounding 403 instead of a sloped surface. Rounding 403 has beginning- and end points 401 and 402. Extending from the beginning- and end points 401 and 402 are respective lines parallel to the branch axis B and to the measuring tube axis. The two lines intersect in the intersection 404.

The rounding here has a constant radius, so that the point of the rounding nearest to the intersection 404 forms at the same time the midpoint between the beginning- and end points. The corresponding thickening distance of the material toward the intersection 404 is based on this midpoint.

Figure 23:
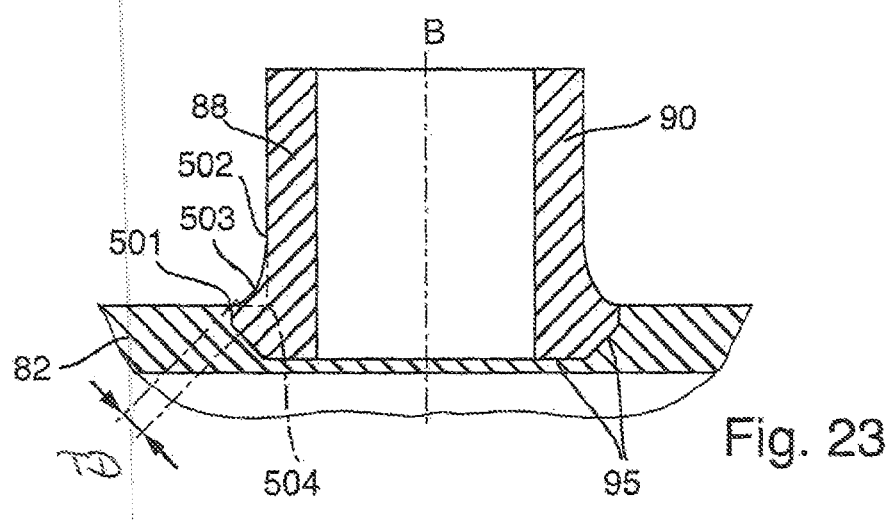
FIG. 23 is a detail view of a transitional region between a measuring tube wall and a wall of the branch of a fifth measuring tube with rounding.

FIG. 23 shows an additional variant of the bonding of a branch 90 having a wall 88 to the measuring tube wall 82 by means of a joint 95. This joint is likewise welded, especially friction welded. The bonding shown in FIG. 23 includes in contrast to FIG. 21 a rounding 503 instead of a sloped surface. The rounding 503 has beginning- and end points 501 and 502. Extending from the beginning- and end points 501 and 502 respectively are two lines, one parallel to the branch axis B and one parallel to the measuring tube axis. The two lines intersect at the intersection 504.

This rounding in contrast to FIG. 22 does not have a constant radius, but, instead, a radius, which changes in the course of the rounding from the starting point 501 to the end point 502. The nearest point of the rounding to the intersection 504 is, consequently, not the midpoint between the beginning- and end points. The corresponding thickening distance of the material toward the intersection 504 from the nearest point of the rounding is shown in FIG. 23.

The invention claimed is:

1. A measuring tube for a flow measuring device, comprising:
   a measuring tube axis;
   a measuring tube wall; and
   a branch with a branch axis and a wall of said branch, wherein:
   the wall of said branch is arranged on said measuring tube wall and is connected with said measuring tube wall by a welded joint;
   the course of an outer contour of said measuring tube defines in at least one cutting plane defined by said branch axis and said measuring tube axis a transitional region, in which the outer contour transfers from a course parallel to said measuring tube axis to a course parallel to said branch axis, said measuring tube wall and/or the wall of said branch have/has in said transitional region a thickening of material surrounding said branch axis, said thickening has in cross section a straight sloped surface or a rounded surface, said thickening is part of the wall of said branch or part of said measuring tube wall, and said sloped surface or rounded surface forms a subsection of the outer contour of said measuring tube, said thickening has a starting point, where the wall thickness of said measuring tube wall or the wall of said branch increases relative to a preceding section and an end point;
   said sloped surface or said rounded surface transitions into an adjoining section;
   lines extend respectively from the starting point and from the end point with a first of these lines extends parallel to said measuring tube axis and a second of these lines extends parallel to said branch axis and said first and said second lines have an intersection, which defines beginning- and end points of a triangle; and
   said intersection and the point of said sloped surface or said stamped surface nearest to said intersection define a thickening distance of the material, which amounts to greater than or equal to 0.7 times the wall thickness of said wall of said branch, when the wall thickness of said wall of said branch is less than the wall thickness of said measuring tube wall, or greater than or equal to 0.7 times the wall thickness of said measuring tube wall, when the wall thickness of said measuring tube wall is less than the wall thickness of said wall of said branch or wherein the thickening distance of the material amounts to maximum 6 mm.

2. The measuring tube as claimed in claim 1, wherein: said welded joint is a machine welded joint.

3. The measuring tube as claimed in claim 2, wherein: said machine welded joint is a friction welded joint.

4. The measuring tube as claimed in claim 1, wherein:
said branch is a sensor nozzle for connecting a medium-contacting sensor to said measuring tube.

5. The measuring tube as claimed in claim 1, wherein:
said branch is a nozzle for connecting an evaluation unit to said measuring tube.

6. The measuring tube as claimed in claim 1, wherein:
said joint directly borders on said sloped surface or said rounded.

7. The measuring tube as claimed in claim 1, wherein:
said sloped surface or said rounded is part of said wall of said branch and that the end point of said sloped surface or said rounded is at the same time the greatest dimension of the thickening of the material of said wall of said branch in the radial direction from said branch axis.

8. The measuring tube as claimed in claim 1, wherein:
said adjoining section or said preceding section of said sloped surface or said rounded is a planar area, which extends parallel to said measuring tube axis, said planar area is associated especially preferably with said measuring tube wall.

9. The measuring tube as claimed in claim 1, wherein:
said measuring tube wall has said sloped surface or said rounded surface.

10. A flow measuring device, especially an ultrasonic, inline, flow measuring device, comprising: a measuring tube axis; a measuring tube wall; and a branch with a branch axis and a wall of said branch, wherein: the wall of said branch is arranged on said measuring tube wall and is connected with said measuring tube wall by a welded joint; the course of an outer contour of said measuring tube defines in at least one cutting plane defined by said branch axis and said measuring tube axis a transitional region, in which the outer contour transfers from a course parallel to said measuring tube axis to a course parallel to said branch axis, said measuring tube wall and/or the wall of said branch have/has in said transitional region a thickening of material surrounding said branch axis, said thickening has in cross section a straight sloped surface or a rounded surface, said thickening is part of the wall of said branch or part of said measuring tube wall, and said sloped surface or rounded surface forms a subsection of the outer contour of said measuring tube, said thickening has a starting point, where the wall thickness of said measuring tube wall or the wall of said branch increases relative to a preceding section and an end point; said sloped surface or said rounded surface transitions into an adjoining section; lines extend respectively from the starting point and from the end point with a first of these lines extends parallel to said measuring tube axis and a second of these lines extends parallel to said branch axis and said first and said second lines have an intersection, which defines beginning- and end points of a triangle; and said intersection and the point of said sloped surface or said stamped surface nearest to said intersection define a thickening distance of the material, which amounts to greater than or equal to 0.7 times the wall thickness of said wall of said branch, when the wall thickness of said wall of said branch is less than the wall thickness of said measuring tube wall, or greater than or equal to 0.7 times the wall thickness of said measuring tube wall, when the wall thickness of said measuring tube wall is less than the wall thickness of said wall of said branch or wherein the thickening distance of the material amounts to maximum 6 mm;
at least one medium-contacting sensor; and
an evaluation unit, wherein:
at least said sensor is secured to said measuring tube by means of said branch.

* * * * *